(12) United States Patent
Kondragunta et al.

(10) Patent No.: US 10,445,688 B2
(45) Date of Patent: Oct. 15, 2019

(54) INVENTORY ORGANIZATION SETUP SYSTEM

(71) Applicant: Oracle International Corporation, Redwood Shores, CA (US)

(72) Inventors: Kishore Kondragunta, Fremont, CA (US); Jose Carlos Martinez Hernandez, Tlaquepaque (MX); Hugo Daniel Rodriguez Nila, Zapopan (MX); Renzo Zagni, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 425 days.

(21) Appl. No.: 14/507,888

(22) Filed: Oct. 7, 2014

(65) Prior Publication Data

US 2016/0098672 A1 Apr. 7, 2016

(51) Int. Cl.
*G06F 16/21* (2019.01)
*G06F 16/23* (2019.01)
*G06Q 10/08* (2012.01)

(52) U.S. Cl.
CPC ......... *G06Q 10/087* (2013.01); *G06F 16/211* (2019.01); *G06F 16/2365* (2019.01)

(58) Field of Classification Search
CPC G06Q 10/1087; G06F 16/211; G06F 16/2365
USPC .......................................................... 705/28
See application file for complete search history.

(56) References Cited

U.S. PATENT DOCUMENTS

| | | | |
|---|---|---|---|
| 6,097,995 A | 8/2000 | Tipton et al. | |
| 6,711,740 B1 * | 3/2004 | Moon | H04L 67/2804 709/230 |
| 7,350,191 B1 | 3/2008 | Kompella et al. | |
| 7,610,219 B2 * | 10/2009 | Sayed | G06F 17/248 705/26.2 |
| 7,698,231 B2 | 4/2010 | Clinesmith et al. | |
| 7,908,164 B1 | 3/2011 | Verma et al. | |
| 7,908,187 B2 | 3/2011 | Reddy et al. | |
| 7,921,030 B1 | 4/2011 | Verma et al. | |
| 8,069,096 B1 * | 11/2011 | Ballaro | G06Q 10/087 705/27.2 |
| 8,255,871 B1 | 8/2012 | Kompella et al. | |

(Continued)

OTHER PUBLICATIONS

Oracle Data Sheet, "Oracle Inventory Management", Copyright 2013.

*Primary Examiner* — Luna Champagne
(74) *Attorney, Agent, or Firm* — Potomac Law Group, PLLC

(57) ABSTRACT

A system that creates an inventory organization within an electronic business system is provided. The system receives a request to create the inventory organization. The system further displays an electronic template within a graphical user interface, the electronic template including inventory organization fields. The system further receives attributes of the inventory organization that are input within the inventory organization fields of the electronic template. The system further validates the attributes of the inventory organization. The system further generates inventory organization data based on the attributes of the inventory organization and rules, the inventory organization data including the attributes of the inventory organization. The system further populates the inventory organization data into a database of the electronic business system.

17 Claims, 9 Drawing Sheets

(56) References Cited

U.S. PATENT DOCUMENTS

| | | |
|---|---|---|
| 8,484,101 B2 | 7/2013 | Gogna et al. |
| 8,554,826 B2 * | 10/2013 | O'Dea ................... G16H 10/60 709/201 |
| 2004/0030602 A1 | 2/2004 | Rosenquist et al. |
| 2004/0039735 A1 | 2/2004 | Ross et al. |
| 2004/0054603 A1 | 3/2004 | Clinesmith et al. |
| 2005/0015439 A1 * | 1/2005 | Balaji ................ G06F 17/30569 709/203 |
| 2008/0263509 A1 * | 10/2008 | Brutman ................... G06F 8/20 717/104 |
| 2009/0083166 A1 | 3/2009 | Reddy et al. |
| 2009/0307152 A1 | 12/2009 | Gogna et al. |
| 2010/0049634 A1 | 2/2010 | Gogna et al. |
| 2010/0131379 A1 * | 5/2010 | Dorais ................ G06Q 30/0601 705/26.1 |
| 2011/0009991 A1 | 1/2011 | Dinicola et al. |
| 2011/0302051 A1 | 12/2011 | Arbatli |
| 2012/0036235 A1 * | 2/2012 | Chan .................... G06F 9/5027 709/220 |
| 2013/0184844 A1 | 7/2013 | Dinicola et al. |
| 2014/0095361 A1 | 4/2014 | Santhanam et al. |

\* cited by examiner

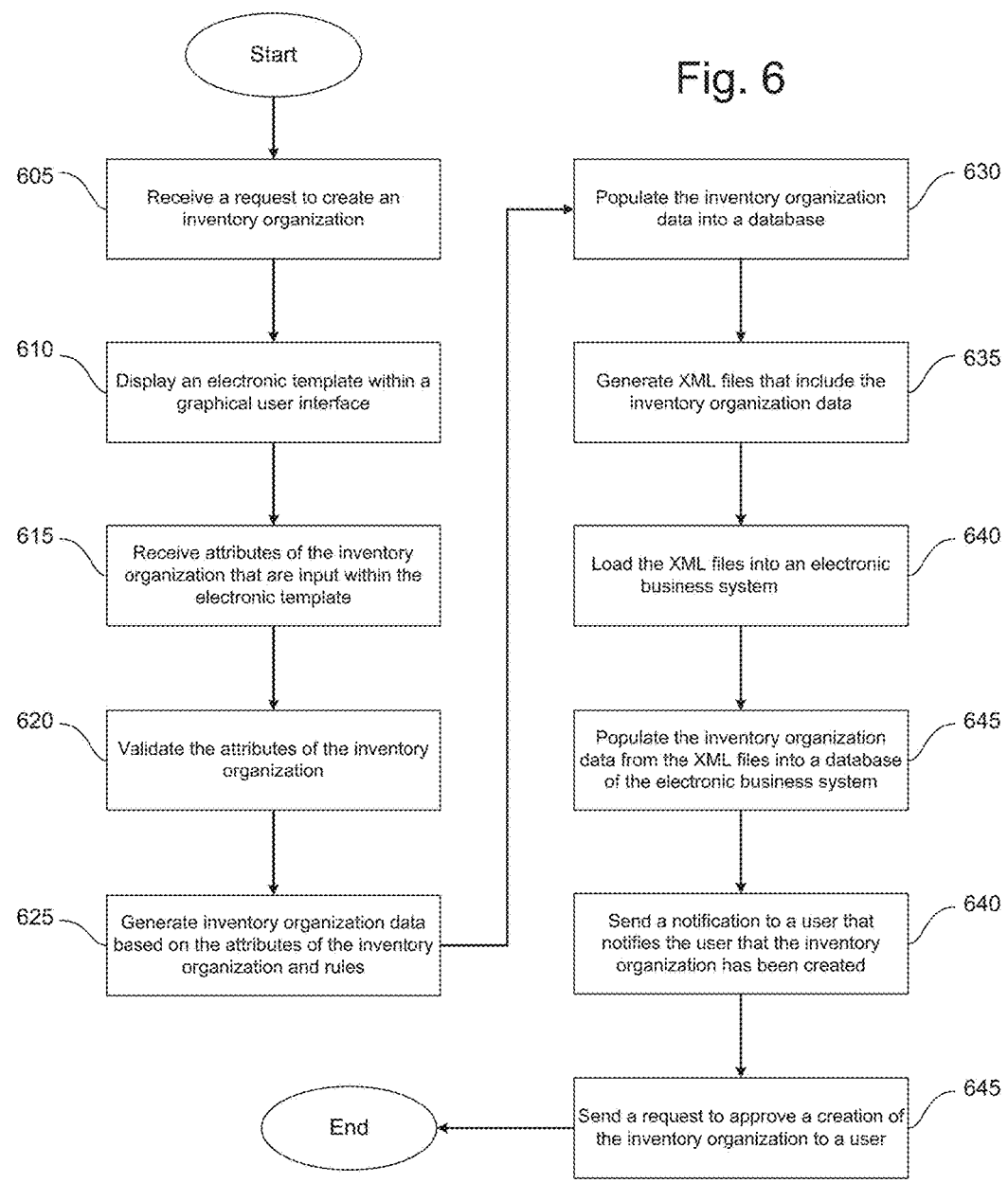

INVENTORY ORGANIZATION SETUP SYSTEM

FIELD

One embodiment is directed to a computer system, and more particularly, to a computer system that manages inventory.

BACKGROUND

Electronic business (or "e-business") is the application of information and communication technologies in support of the activities of a business. E-business computer systems typically manage the e-business of a company, or other type of organization. More specifically, an inventory management computer system (which can be part of an overall e-business computer system) typically tracks and manages inventory for a wide range of materials including components, ingredients, finished goods, spare parts, returns, scrap, and retables. Since e-businesses typically involve the movement of goods across multiple countries, an inventory management computer system (or "inventory management system") also typically tracks and manages inventory organizations within multiple countries, where an inventory organization can be a physical or legal entity, such as a facility, that stores or transacts inventory items.

Each inventory organization typically requires a set of steps to be implemented in order for an inventory organization to be created within the inventory management system, and thus, within an overall e-business computer system (or "e-business system"). These steps can include setups for different attributes of the inventory organization, where an inventory organization can include attributes such as sub-inventories, shipping networks, and planner codes. The setups can span across multiple modules of the inventory management system, and can also span across modules of the overall e-business system. Due to the fact that the setups can potentially span across many modules, the setups can result in dependency and permission issues, as well as time and resource constraints. Further, the setups can be a very time-consuming and error-prone process, involving requirement gathering and setup verification efforts from multiple individuals across multiple environments.

SUMMARY

One embodiment is a system that creates an inventory organization within an electronic business system. The system receives a request to create the inventory organization. The system further displays an electronic template within a graphical user interface, the electronic template including inventory organization fields. The system further receives attributes of the inventory organization that are input within the inventory organization fields of the electronic template. The system further validates the attributes of the inventory organization. The system further generates inventory organization data based on the attributes of the inventory organization and rules, the inventory organization data including the attributes of the inventory organization. The system further populates the inventory organization data into a database of the electronic business system.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 6 illustrates a flow diagram of the functionality of an inventory organization setup module, according to an embodiment of the invention.

DETAILED DESCRIPTION

According to an embodiment, an inventory management system can provide an automatic end-to-end inventory organization setup process for creating a new inventory organization within an electronic business system, such as an "Oracle E-Business Suite" product by Oracle Corporation. The inventory management system can receive attributes of an inventory organization, or another type of inventory organization data, that are input into an electronic template that is displayed within a graphical user interface. The inventory management system can further automatically validate the attributes that are input into the inventory management system. The inventory management system can further automatically generate inventory organization data based on the attributes of the inventory organization, where the inventory organization data can include the attributes. The inventory management system can further automatically populate the inventory organization data within a database of the inventory management system, where the database structures the inventory organization data appropriately. The inventory management system can further automatically push the inventory organization data from the database of the inventory management system into a database of an electronic business system. In accordance with the embodiment, a user of the electronic business system can create a new inventory organization within the electronic business system, where a majority of the steps of the process are automated steps.

Figure 1:
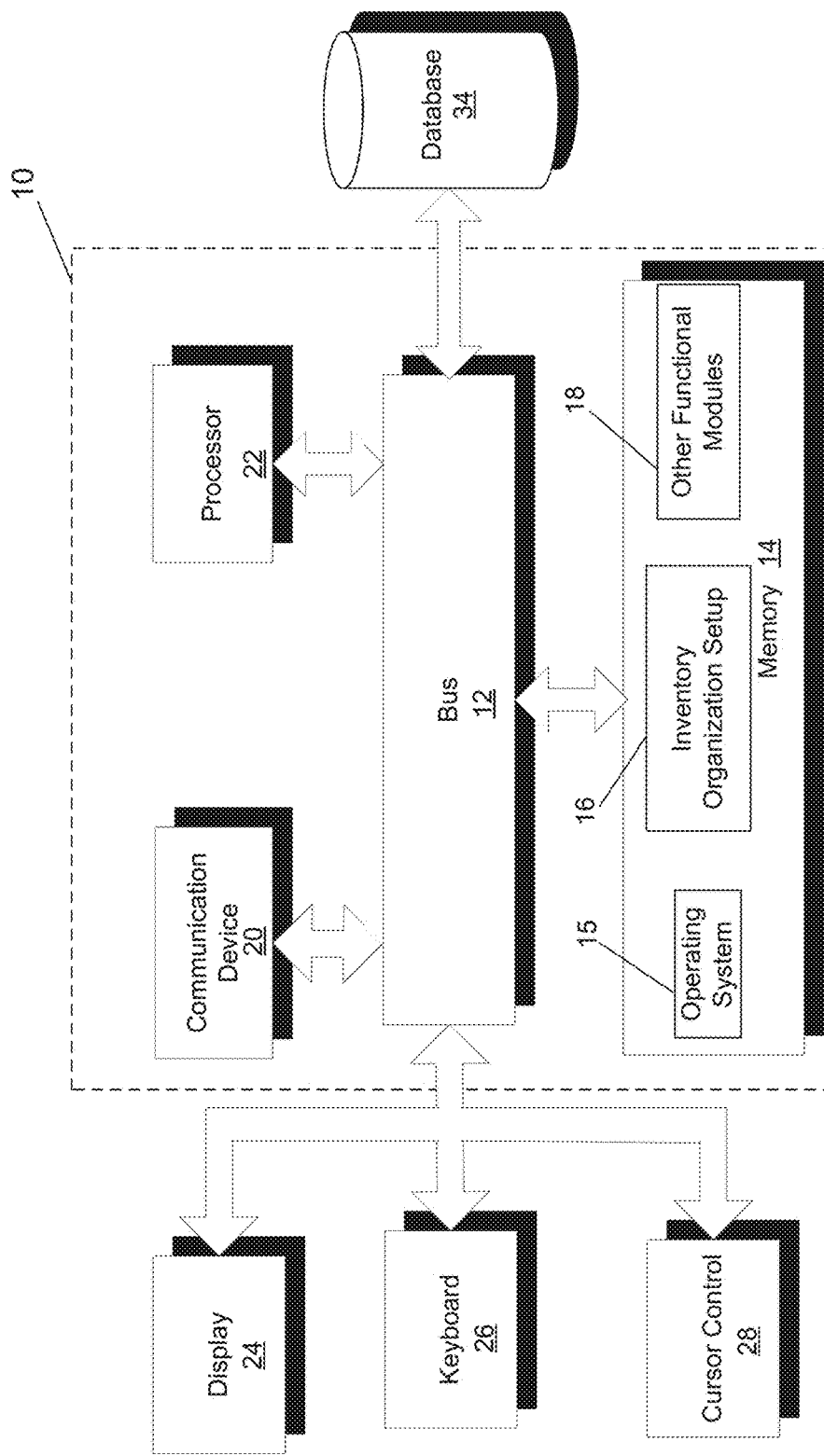
FIG. 1 illustrates a block diagram of a system that can implement an embodiment of the invention.

FIG. 1 illustrates a block diagram of a system 10 that can implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, an inventory organization setup module 16, as well as other functional modules 18. Operating system 15 can provide an operating system functionality for system 10. Inventory organization setup module 16 can provide functionality for creating an inventory organization, as further disclosed below. In certain embodiments, inventory organization setup module 16 can comprise a plurality of modules, where each module provides specific individual functionality for creating an inventory organization. System 10 can also be part of a larger system. Thus, system 10 can include one or more additional functional modules 18 to include the additional functionality. For example, functional modules 18 may include modules that provide additional functionality, such as functionality of an "Oracle Inventory Management" product by Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

As previously described, in order to create an inventory organization within an inventory management system, a set of steps is typically required, where the set of steps can include setups for different attributes of the inventory organization. In known inventory management systems, there were typically two options to set up the data for an inventory organization. The first option is to manually fill out all the data related to an inventory organization (i.e., "inventory organization data") in each form of the inventory management system (and potentially the overall e-business system). Thus, the setup according to this option involves filling in the necessary data in all related forms (e.g., 17 different forms for an inventory module, 4 different forms for a fulfillment module, and 3 different forms for a planners desktop module). This option can be tedious and cumbersome, as it requires a user, or users, to manually input a significant amount of data within multiple forms.

The second option is to pre-populate the organization-related data into a spreadsheet for each of the modules of an electronic business system. After the spreadsheet is populated, each sheet of the spreadsheet is saved as a comma-separated values ("CSV") file. The CSV file is then converted into an extensible markup language ("XML") file, and saved as an archive file, such as a ZIP file, along with other reference files. Once all the ZIP files are generated, each ZIP file is uploaded to the electronic business system using a module, such as an iSetup module. iSetup is a module typically used to manage a migration of setup data between different instances of the electronic business system. Once all the ZIP files are uploaded via iSetup, or some other data migration module, each file is selected and loaded into a database of the electronic business system. However, this option can also be tedious and cumbersome due to the significant amount of time required to create the original spreadsheets and to load each file into the electronic business system.

In known inventory management systems, once a request to create a new inventory organization is created, it can take 7 to 10 business days to complete the request as multiple modules may be involved in the process and each module can have different priorities. The requests may need to be executed in multiple environments involving test and production environments, which can take approximately 22-28 business days to create, validate, and migrate to production.

For example, in one known inventory management system, such as a previous version of an "Oracle Inventory Management" product by Oracle Corporation, the end-to-end process for creating a new inventory organization can be outlined as follows. First, a business creates a service request ("SR") that includes a request to create a new inventory organization. Next, a customer services team ("CST") creates a request to create an interface with an electronic business system, and sends the request to a service company that ships products to customers, such as DHL. Subsequently, the CST creates a request to create an inventory organization within the electronic business system, and sends the request to an inventory module.

The inventory module subsequently creates the following information within the electronic business system: location information; organization headers; organization parameters; organization spare parts planning ("SPP"); receiving parameters; sub-inventories; planner codes; account aliases; hierarchies; item groups information; item class information; planning parameters; item propagation information; shipping networks (if needed); shipping methods (if needed); and item class assignment (if needed). The inventory module further creates two requests: one for a fulfillment module; and another for a customer data ("CDI")/trading community architecture ("TCA") module.

Based on the request sent to the fulfillment module, the fulfillment module creates the following information within the electronic business system: shipping methods; shipping parameters; shipping pick rules; and region-based transit lead times. Based on the request sent to the CDI/TCA module, the CDI/TCA module creates a customer as well as necessary customer information within the electronic business application.

The inventory module subsequently requests the CST to create the planner desktop setups to cover the following information: geo-coding (concurrent); sub-inventories; human zone ("HZ") locations; contacts; direct/indirect organization; spares management (min/max); cutoff times; service company (e.g., DHL) warehouse code; node type; node name; stocking site type; calendar; time zone; managing entity; stocking part exclusion; and delivery times. If applicable, the inventory module further requests a value chain planning ("VCP") system to complete VCP system setups. The inventory module subsequently requests a human resources ("HR") module to run concurrent jobs in the electronic business system to update security profiles pertaining to the new inventory organization. Such security profiles can include the following profiles: MISINV_S-PARES_ALL; MISINV_SPARES_(APAC, AMER, EMEA, LAD); or a field service security profile (such as daily business intelligence or "DBI"). The inventory module finally generates and sends reports to a global process owner ("GPO") module and an inventory closing module for validation and approval.

Therefore, in known inventory management systems, the nature of the inventory organization setup process is manual in nature, and, typically, there is no uniform, systematic, end-to-end process for creating a new inventory organization. Further, the manual nature of the inventory organization setup process can be prone to human error. Further, after the setup is completed, if there is an issue, it can be very cumbersome to pinpoint where the error originated from, and can take multiple manual steps and dependencies to rectify the error. Even further, the manual process can take a significant amount of time (e.g., 8-10 days).

In accordance with an embodiment, a new end-to-end automated setup process for creating a new inventory organization can be provided. This automated process can simplify the process of creating a new inventory organization, while applying the necessary checks and balances before the inventory organization is created. With the automated process, a user can create a new inventory organization through a majority of automated steps.

According to an embodiment, an inventory management system that utilizes the automated setup process is different from known inventory management systems in several ways, especially regarding how inventory organization data is generated, and how certain setup process steps are automated. First, instead of creating and storing inventory organization data in a spreadsheet, the inventory management system can include a database that stores all the inventory organization data related to inventory organizations. Once a request to create a new inventory organization is generated, the inventory management system can validate the inventory organization data, and propagate the inventory organization data in the database as needed in order to be able to load the inventory organization data into an electronic business system. Second, the inventory management system can validate inventory organization data, such as attributes of an inventory organization, which is input by a user for accuracy. The validations can ensure that all the necessary inventory organization data is being entered by the user, and, at the same time, ensure that the system is not duplicating the inventory organization. Third, based on the initial inventory organization data entered by the user, the inventory management system can pull subsequent inventory organization data from other external sources into the database, or can prepopulate the subsequent inventory organization data within the database. This can alleviate the need for the user to enter some of the inventory organization data. Fourth, the inventory management system can provide a workflow that can structure a sequence of required steps in a setup process used to create each inventory organization.

Figure 2:
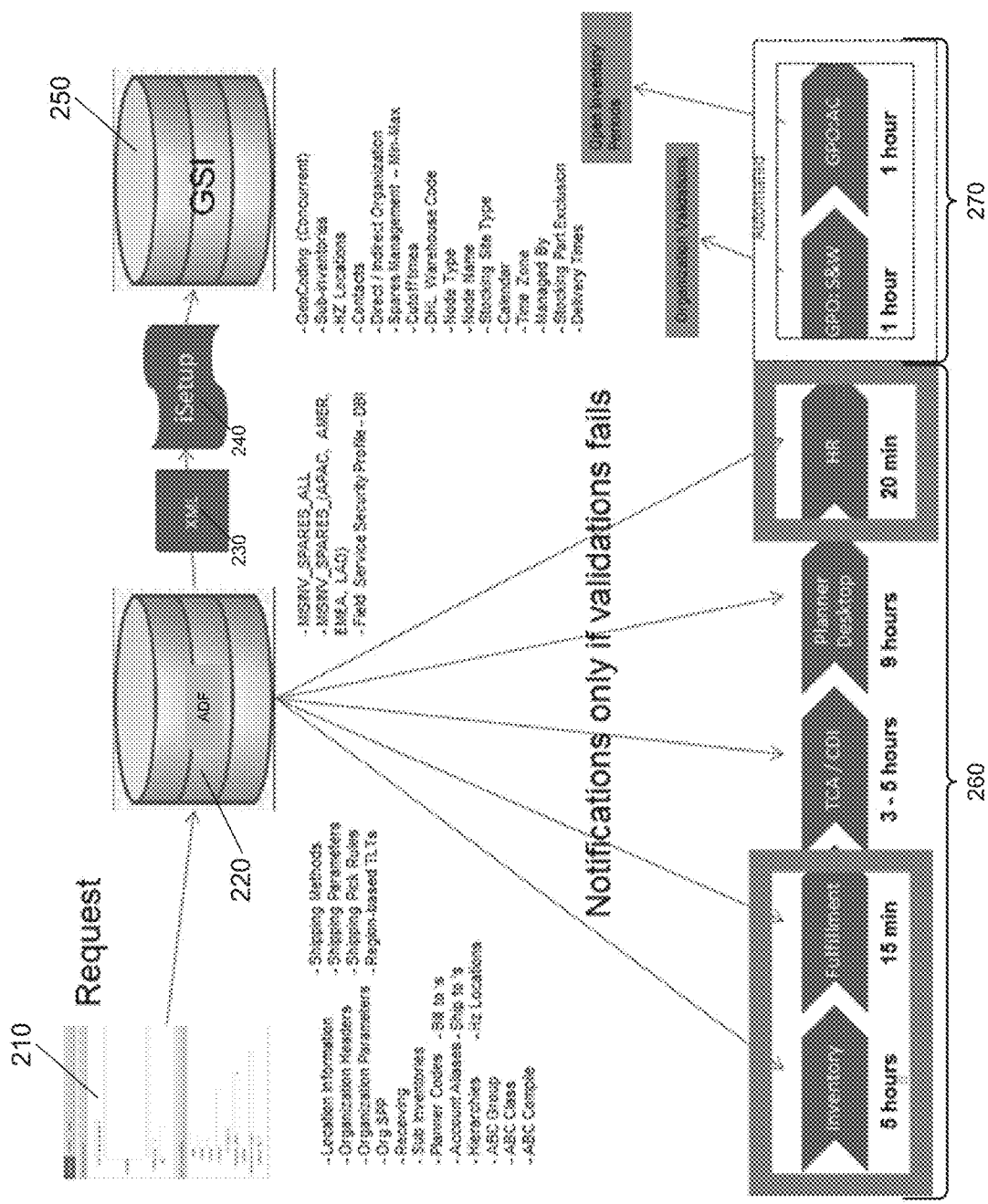
FIG. 2 illustrates an automated inventory organization setup process implemented by an inventory management system according to an embodiment of the invention.

FIG. 2 illustrates an automated inventory organization setup process implemented by an inventory management system according to an embodiment of the invention. The inventory management system includes an electronic template 210. Electronic template 210 is an electronic form that can be displayed within a graphical user interface at a client device, such as a client computer, and that includes one or more data fields (in this embodiment, inventory organization fields). Electronic template 210 can be generated in response to the inventory management system receiving a request to create a new inventory organization. A user of the inventory management system can input inventory organization data, such as one or more attributes of a new inventory organization that the user wishes to create, within the inventory organization fields of electronic template 210. An example of electronic template 210 and examples of attributes of an inventory organization are further described below in greater detail in conjunction with FIGS. 5A and 5B.

Further, electronic template 210 can include a first graphical user interface element, such as a validate button, that, when clicked or otherwise interfaced with, can cause electronic template 210 to perform validations on the one or more attributes of the new inventory organization. Such validations can include: validating that the new inventory organization does not already exist within the inventory management system; or validating that attributes have been input within the mandatory inventory organization fields of electronic template 210. In addition, electronic template 210 can also include a second graphical user interface element, such as a save button, that, when clicked or otherwise interfaced with, can cause electronic template 210 to save the one or more attributes, and to send the one or more attributes to application development framework ("ADF") 220. Once the user clicks on, or otherwise interfaces with, the second graphical user interface element, the process for creating the inventory organization within the electronic business system is automatic, and does not require any further interaction from the user.

The inventory management system further includes ADF 220. ADF 220 is an application development framework that resides at a server device, such as a server computer. ADF 220 can include a data software application that includes one or more modules containing computer-readable instructions and a database including one or more database tables containing one or more fields. In one embodiment, the database of ADF 220 can be a separate database schema that is created on the same instance as a database of the electronic business system. In other embodiments, the database of ADF 220 can be a separate database. In one embodiment, ADF 220 can be an Oracle Application Express ("APEX") product by Oracle Corporation. An APEX database is a custom database schema hosted alongside an electronic business system database to provision custom applications associated with the electronic business system. An APEX database contains information necessary for creating an organization within the electronic business system. This information is related to each parameter, flag, or value required based on a structure of the organization that is required to be created, regardless of an organization tier or country that will be utilizing the new organization.

ADF 220 can receive the one or more attributes of the new inventory organization from electronic template 210. ADF 220 can subsequently generate inventory organization data based on the received attributes of the new inventory organization, where the inventory organization data includes the received attributes of the new inventory organization and can include additional attributes of the new inventory organization generated by ADF 220. The additional attributes can be attributes that are not included within electronic template 210. Further, the additional attributes can be generated automatically depending on a type of organization. More specifically, each organization type can have different attributes (e.g., post to GL flag, subinventories needed, item groups and assignments) that are automatically generated by ADF 220. Each set of attributes can be different for each type of organization, and ADF 220 can identify the set of attributes to be generated, and can automatically generate the identified attributes. ADF 220 can further populate the inventory organization data within the database of ADF 220. Example organization types and example attribute sets that are automatically generated are shown in the following table:

| Organization Type | Attribute Set |
| --- | --- |
| Tier T1: Distribution Hubs - 4 Physical Locations - Leipzig, Ohio (US), Miami (US), and Singapore | LO % - Ohio, US, MI % - Miami, US, SI % Singapore, LE % - Leipzig<br>4 Types of Inventory Organizations:<br>WWOPS Purchasing Hub (GOOD only) - LOW, MIW, SIW, and LEW<br>Spares Distribution Hubs (GOOD only) - LOC, MIA, SIN, LEZ<br>Spares Distribution Hubs (NEW only) - MI2, SI2, LE2<br>Spares Bad Parts Only Orgs - LO3, MI3, SI3, LE3 |
| Tier T2: Country Stores - Not in US, these are country level distribution sites. Typically 1 per country except for AU and CN | Organization Short Name: Typically First 3 letters of country location, i.e.: Sydney, Australia = SYD. For Indirect countries, there will be Spares Club Inventory Orgs and these do not post transactions to GL since Spares Club inventory is not owned<br>Will have Good and Bad part shipments<br>7 sub-inventories per organization |
| Tier T3: City/Local in Country Stores | Organization Short Name: Typically first 3 letters of city<br>Will have Good and Bad part shipments<br>7 sub-inventories |
| Tier T5: 1 Per Country, these serve as logical inventory organizations that track spares physically stored at Customer sites | Organization Short Name: 3rd character of short code is "5"<br>Will have Good and Bad part shipments<br>Each sub-inventory represents a customer |
| Tier T6: 1 Per Country, these serve as logical inventory organizations that track spares physically stored at the Field Service Engineer (FE) level. | Organization Short Name: 3rd character of short code is "6"<br>Will have Good and Bad part sub-inventories<br>Each sub-inventory represents a Field Service Engineer |
| Tier T7: Repair Vendors | Organization Short Name: 1st character is supplier, 2nd character is "B' (bad) or "W" (wip)<br>RV Inventory Organizations in each Region OU (OAI. APAC, EMEA), BR, ARG , and India have T7s<br>2 sub-inventories per organization |
| Tier T8: Scrap Vendors - 1 per Direct Country | Organization Short Name: 3rd character of short code is "8"<br>2 sub-inventories per organization |

According to the embodiment, ADF 220 can generate inventory organization data based on the one or more attributes of the new inventory organization and one or more rules that are stored within the data software application of ADF 220. A rule is a computer-readable instruction that can include a condition and an action, where a condition can be the reception of one or more attributes of an inventory organization, and the action can be the generation of inventory organization data associated with the inventory organization. In one embodiment, the one or more rules can defined as indicated in the above table, and, further, can be based on an organization type (e.g., tier), or based on whether the organization is a direct organization or an indirect organization. In other words, the one or more rules for propagating items can be based on a country of the new inventory organization and/or a type (e.g., tier) of the inventory organization. Example rules are now described below in greater detail.

For example, an attribute that indicates whether the inventory organization is a direct organization or an indirect organization can be a condition for a rule, where the action is the generation of an attribute that indicates a sub-inventory associated with the inventory organization. A direct organization is an organization that has a legal presence is a specified country, and has some type of legal ownership in a physical facility that is within the specified country. An indirect organization is an organization that does not have a legal presence in a specified country, and, instead, works with one or more partners with a legal presence in the specified country. Thus, according to the example, when an attribute indicates that the inventory organization is a direct organization, an attribute that indicates a sub-inventory is generated with a value that indicates the sub-inventory is asset-trackable. When the attribute indicates that the inventory organization is an indirect organization, an attribute that indicates a sub-inventory is generated with a value that indicates the sub-inventory is non-asset-trackable. Further, according to the embodiment, based on whether the attribute that the inventory organization is either a direct organization or an indirect organization, an attribute that indicates a planner desktop module is generated with a value of either direct or indirect.

As another example, an attribute that indicates a country that the inventory organization is located in can be a condition for a rule, where the action is the generation, or validation, of an attribute that indicates address information. Thus, for example, countries like U.S. and Brazil can require different address information, and ADF 220 can either generate, or identify, missing address information for those countries.

As yet another example, an attribute that indicates a tier under the inventory organization can be a condition for a rule, where the action is the generation of VCP attributes, item class attributes, item compilation attributes, item group attributes, planning parameter attributes, and/or item class assignment section attributes. For example, Tiers 1, 2, and 3 may require the generation of VCP organization attributes. Further, Tiers 1, 2, 3, and direct organizations may require the generation of item class attributes, item compilation attributes, item group attributes, planning parameter attributes, and/or item class assignment section attributes. Further, Tier 2 warehouse distribution agreement ("WDA") indirect organizations may require the generation of attributes required for Tier 1, 2, and 3 direct organizations.

As yet another example, an attribute that indicates whether the inventory organization is a direct organization or an indirect organization, or an attribute that indicates a tier under the inventory organization, can be a condition for a rule, where the action is the generation of one or more attributes that indicate one or more shipping network rules. For example, a direct organization may require different shipping network rules than an indirect organization. Further, each tier may require different shipping network rules as compared to other tiers.

According to the embodiment, the inventory management system retrieves the inventory organization data from the database of ADF 220, and automatically generates one or more XML files 230 that include the inventory organization data. In one embodiment, each XML file 230 includes a portion of the inventory organization data associated with a specific module of the electronic business system. Each header of the one or more XML files 230 can have an Application Programming Interface ("API") according to the portion of the inventory organization data included within each XML file 230. Once the API is added to each XML file 230, then the tags describing each portion of the inventory organization data are the tags used in the electronic business system by the API. If any of the tags are added incorrectly, then data migration application 240 will fail when attempting to load the inventory organization data into the electronic business system. Each XML file 230 can have different tags and different APIs, and the electronic business system can automatically use the correct API and encode it using a standard UTF-8 format. Subsequently, the inventory management system sends XML files 230 to data migration application 240. In one embodiment, data migration application 240 can be an iSetup product by Oracle Corporation. Data migration application 240 subsequently loads the inventory organization data contained within XML files 230 into one or more database fields of one or more database tables of a database 250 of the electronic business system. More specifically, data migration application 240 reads selected API information from each XML file 230 and loads a specific interface. Data migration application 240 then matches the tags used in each XML file 230 to gather the inventory organization data needed to write into one or more database tables of database 250. Once the mapping is correct, data migration application 240 starts the writing process by passing inventory organization data through one or more data validations in the electronic business system. As described below in more detail, if any of the data validations fail, then a warning log, or error log, is generated. In one embodiment, database 250 is part of a global single instance ("GSI") of the electronic business system. Further, in one embodiment, data migration application 240 can sequentially load the portion of the inventory organization data contained within each XML file into one or more database fields of one or more database tables of database 250, where the one or more database fields of the one or more database tables can be associated with a specific module of the electronic business system.

According to an embodiment, before data migration application 240 loads the inventory organization data contained within XML files 230, data migration application 240 validates the inventory organization data. As part of the validation, data migration application 240 can determine whether the inventory organization data necessary to create a new inventory organization has been generated. If any problem with the inventory organization data is identified, data migration application 240 can send a notification to ADF 220, and ADF 220 can send one or more notifications 260 to one or more users of the inventory management system.

During loading of inventory organization data into database 250, the inventory management system can further trigger a concurrent process, identified as item propagation. The item propagation process populates a database table of database 250 with one or more items that will be propagated into the new inventory organization.

After the loading of inventory organization data into database 250 is complete, the inventory management system sends one or more requests for approval 270 to a GPO module and inventory closing module. Once the GPO module and the inventory closing module approve, the inventory management system sends a confirmation of a completion of the process of creating the new inventory organization to the user. The specific steps of the automated inventory organization setup process illustrated in FIG. 2 are further described below in greater detail in conjunction with FIGS. 3, 4A, 4B, and 4C.

Figure 3:
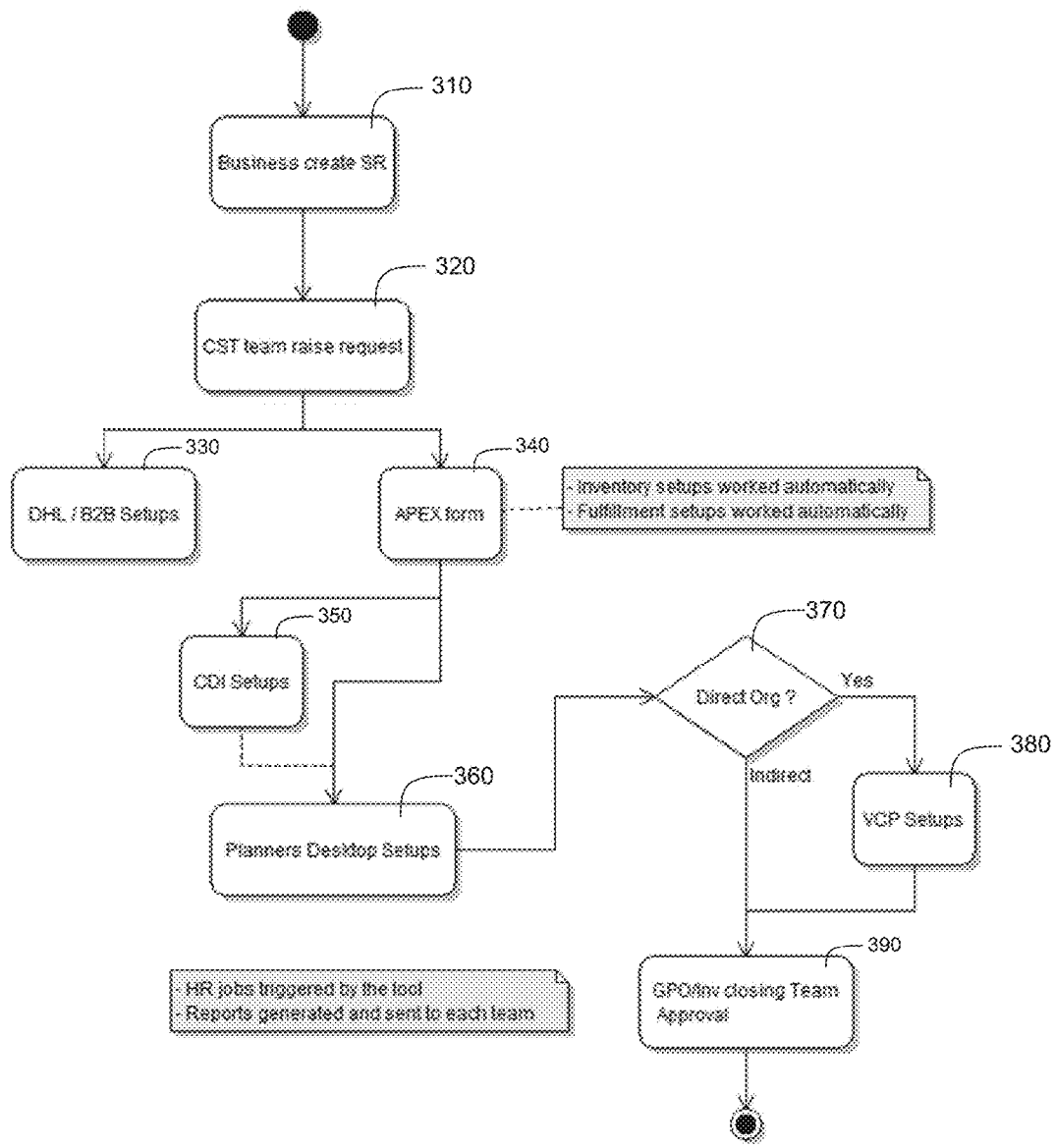
FIG. 3 illustrates an automated inventory organization setup process, according to an embodiment of the invention.

FIG. 3 illustrates an automated inventory organization setup process, according to an embodiment of the invention. In one embodiment, the functionality of the flow diagram of FIG. 3, as well as the functionality of the flow diagrams of FIGS. 4A, 4B, 4C, and 6, are each implemented by software stored in a memory or some other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins and proceeds to 310. At 310, a business creates a service request that includes a request for a new inventory organization. The flow then proceeds to 320. At 320, the CST creates a request within an inventory management system to create a new inventory organization. The flow then concurrently proceeds to 330 and 340.

At 330, the CST creates a request to create an interface with an electronic business system, and sends the request to a services company that ships products to customers, such as DHL. The flow then proceeds to 340.

At 340, the inventory management system displays an electronic template within a graphical user interface, where the electronic template includes one or more inventory organization fields. In one embodiment, the electronic template is an APEX form template. A user subsequently inputs one or more attributes of the inventory organization within the one or more inventory organization fields of the electronic template. This is further described below in greater detail in conjunction with new request module 410 of FIG. 4A.

The inventory management system subsequently performs validations on one, some, or all, of the one or more attributes of the inventory organization, where the validations are associated with an inventory module of the electronic business system. The inventory management system further generates inventory organization data associated with the inventory module of the electronic business system, where the inventory organization data includes one, some, or all, of the one or more attributes of the inventory organization. The inventory management system populates the generated inventory organization data into one or more database fields of one or more database tables of a database of the electronic business system, where the one or more database tables are associated with the inventory module of the electronic business system. In one embodiment, the one or more database tables are GSI tables. This is further described below in greater detail in conjunction with inventory module 420 of FIG. 4A.

The inventory management system subsequently performs validations on one, some, or all, of the one or more attributes of the inventory organization, where the validations are associated with a fulfillment module of the electronic business system. The validations associated with the fulfillment module can be different from the validations associated with the inventory module. The inventory management system further generates inventory organization data associated with the fulfillment module of the electronic business system, where the inventory organization data includes one, some, or all, of the one or more attributes of the inventory organization. The inventory management system populates the generated inventory organization data into one or more database fields of one or more database tables of a database of the electronic business system, where the one or more database tables are associated with the fulfillment module of the electronic business system. In one embodiment, the one or more database tables are GSI tables. This is further described below in greater detail in conjunction with fulfillment module 440 of FIG. 4B. The flow then proceeds to 350.

At 350, the inventory management system performs validations on one, some, or all, of the one or more attributes of the inventory organization, where the validations are associated with a TCA/CDI module of the electronic business system. The validations associated with the TCA/CDI module can be different from the validations associated with the inventory module and the fulfillment module. The inventory management system further generates inventory organization data associated with the TCA/CDI module of the electronic business system, where the inventory organization data includes one, some, or all, of the one or more attributes of the inventory organization. The inventory management system further sends the inventory organization data to the TCA/CDI module, where the TCA/CDI module populates the generated inventory organization data into one or more database fields of one or more database tables of a database of the electronic business system, where the one or more database tables are associated with the TDA/CDI of the electronic business system. In one embodiment, the one or more database tables are GSI tables. This is further described below in greater detail in conjunction with TCA/CDI module 430 of FIG. 4A. The flow then proceeds to 360.

At 360, the inventory management system performs validations on one, some, or all, of the one or more attributes of the inventory organization, where the validations are associated with a planner desktop module of the electronic business system. The inventory management system further generates inventory organization data associated with the planner desktop module of the electronic business system, where the inventory organization data includes one, some, or all, of the one or more attributes of the inventory organization. The inventory management system populates the generated inventory organization data into one or more database fields of one or more database tables of a database of the electronic business system, where the one or more database tables are associated with the planner desktop module of the electronic business system. In one embodiment, the one or more database tables are GSI tables. This is further described below in greater detail in conjunction with planner desktop module 450 of FIG. 4B. The flow then proceeds to 370.

At 370, the inventory management system determines whether the inventory organization is a direct organization or an indirect organization. If the inventory organization is a direct organization, the flow proceeds to 380. If the inventory organization is an indirect organization, the flow proceeds to 390. This is because direct organizations are controlled by a VCP system that is separate from the electronic business system, whereas indirect organizations are controlled by the electronic business system.

At 380, the inventory management system performs validations on one, some, or all, of the one or more attributes of the inventory organization, where the validations are associated with a VCP system, which can be separate from the electronic business system. The validation associated with VCP system can be different from the validations associated with the inventory module, the fulfillment module, and the planner desktop module. The inventory management system further generates inventory organization data associated with the VCP system, where the inventory organization data includes one, some, or all, of the one or more attributes of the inventory organization. The inventory management system further sends the inventory organization data to the VCP system, where the VCP system populates the generated inventory organization data into one or more database fields of one or more database tables of a database of the VCP system. The flow then proceeds to 390.

At 390, the inventory management system updates security profile data associated with the new inventory organization that is stored within one or more database fields of one or more database tables of a database of the electronic business system. This is further described below in greater detail in conjunction with HR module 460 of FIG. 4B. Subsequently, the inventory management system generates requests for approval of the new inventory organization, and sends the requests for approval to the GPO module and the inventory closing module. In one embodiment, the request for approval is a report that includes the inventory organization data associated with the new inventory organization and a request for approval of the new inventory organization. This is further described below in greater detail in conjunction with GPO module 470 and inventory closing module 480 of FIG. 4C. Subsequently, the inventory management system sends a confirmation that the new inventory organization has been created. The flow then ends.

Figure 4A:
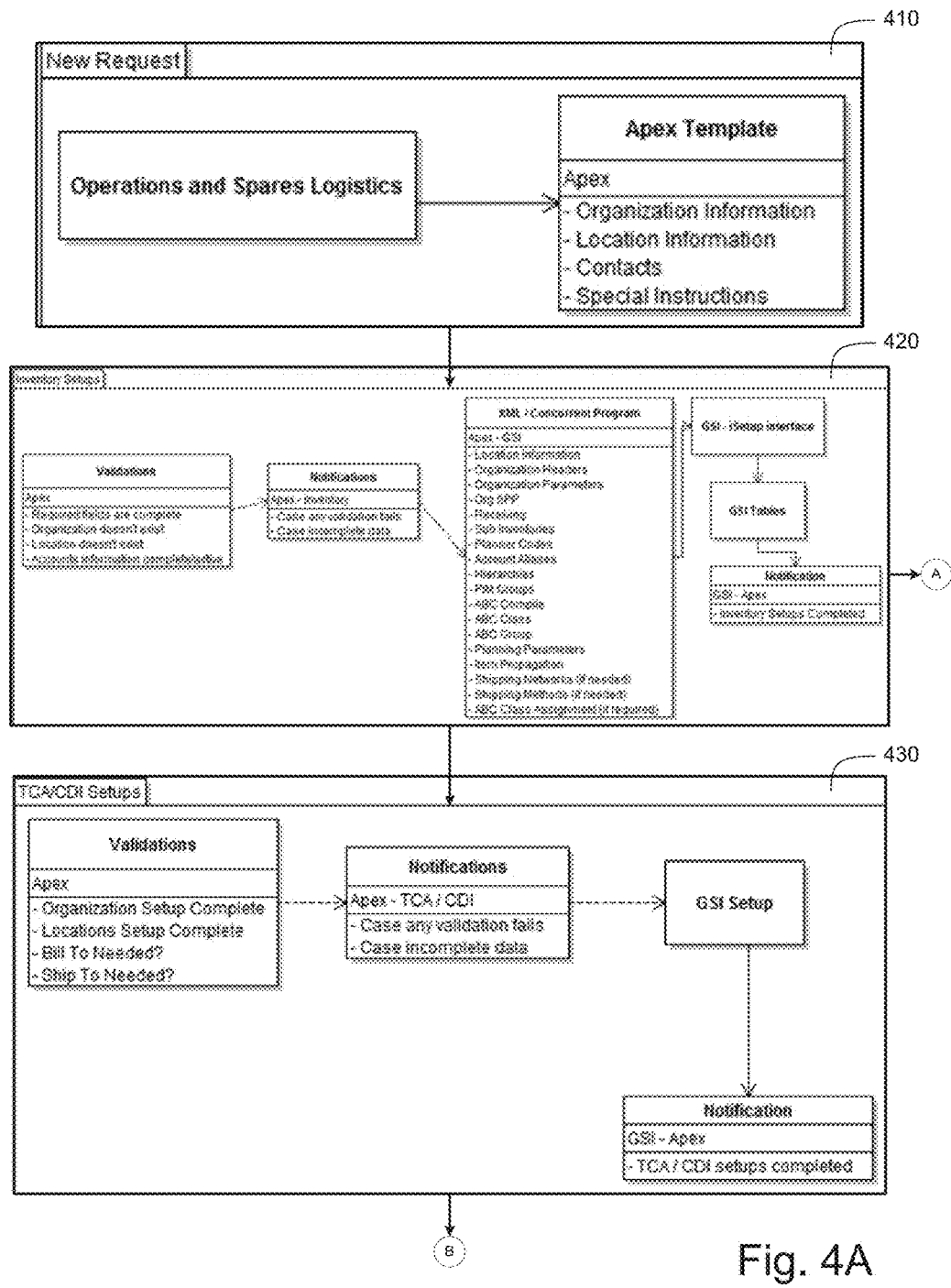
FIGS. 4A, 4B, and 4C illustrate an architecture diagram of an inventory management system that implements an automated inventory organization setup process, according to an embodiment of the invention.
Figure 4B:
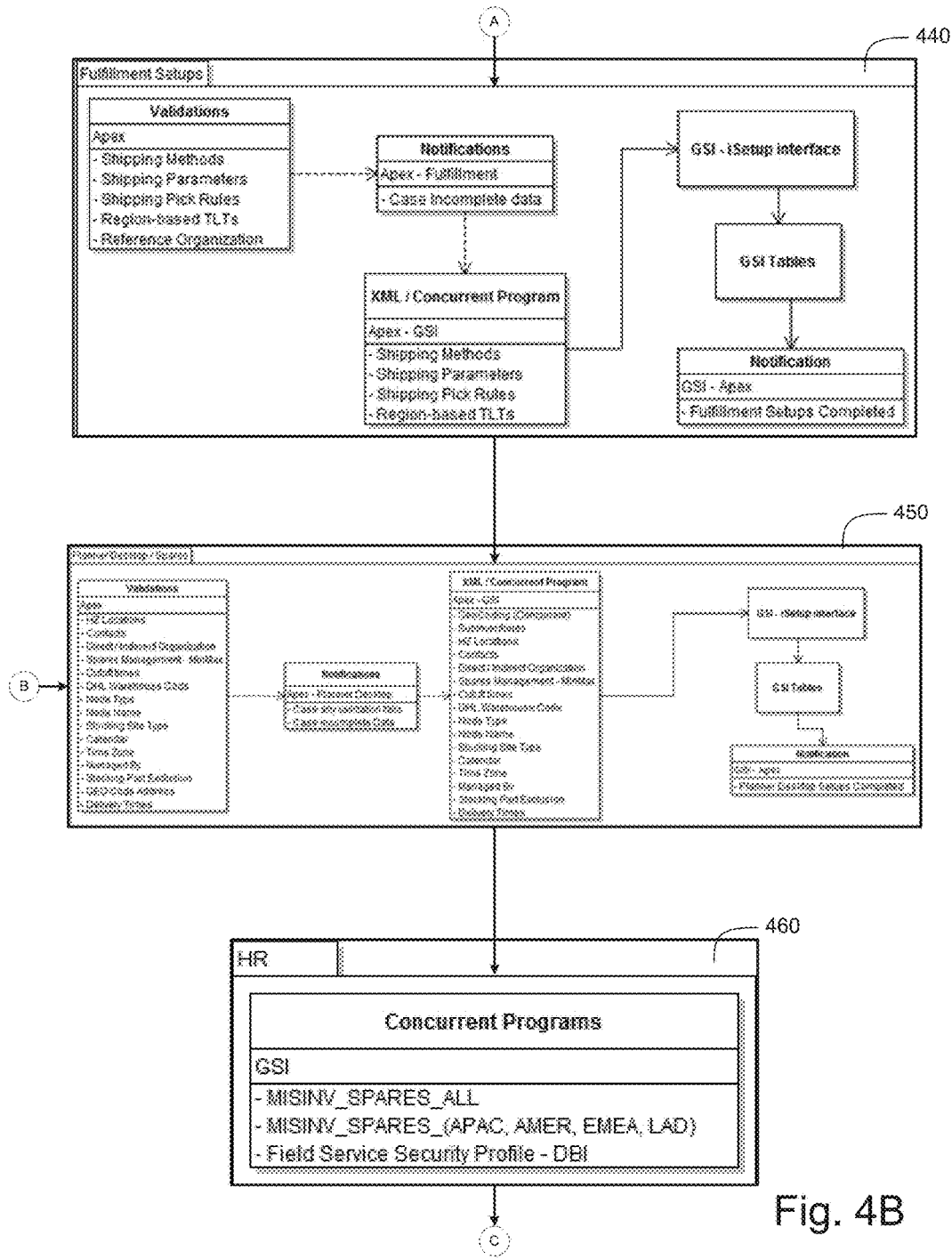
Figure 4C:
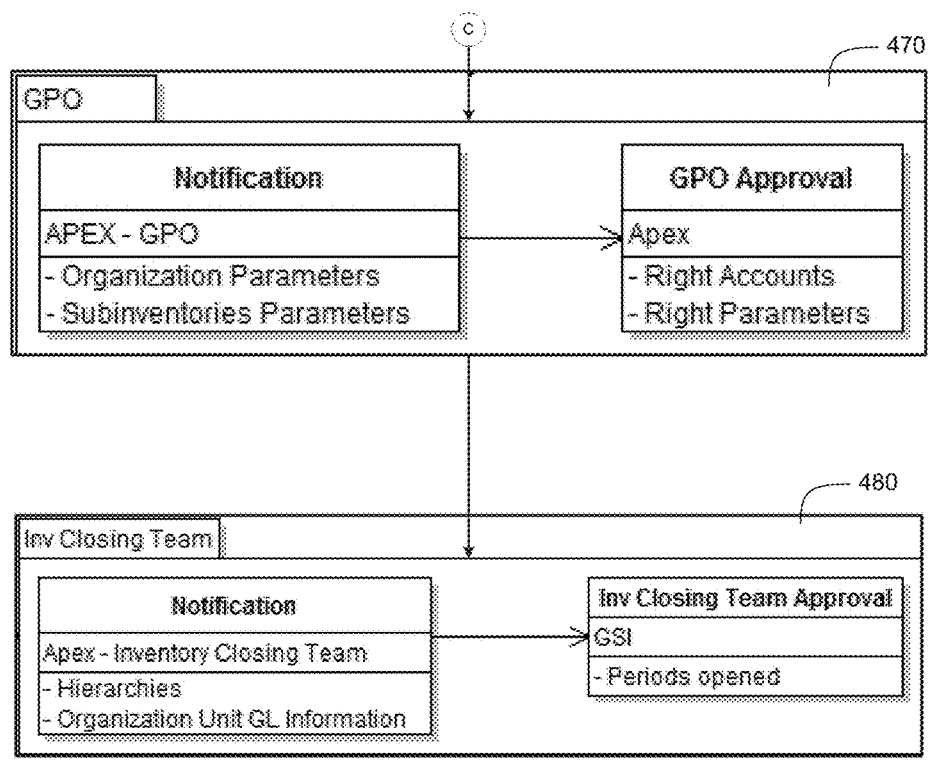

FIGS. 4A, 4B, and 4C illustrate an architecture diagram of an inventory management system that implements an automated inventory organization setup process, according to an embodiment of the invention. The inventory management system includes the following modules that can be stored on a memory of the inventory management system and that can be executed by a processor of the inventory management system: new request module 410; inventory module 420; TCA/CDI module 430; fulfillment module 440; planner desktop module 450; HR module 460; GPO module 470; and inventory closing module 480.

The flow begins and proceeds to new request module 410. New request module 410 displays an electronic template within a graphical user interface, where the electronic template includes one or more inventory organization fields. In one embodiment, the electronic template is an APEX form template. A user subsequently inputs one or more attributes of the inventory organization within the one or more inventory organization fields of the electronic template. In an embodiment, the one or more attributes includes at least one of: organization information; location information; contacts; or special instructions. The flow then proceeds to inventory module 420.

Inventory module 420 performs validations on one, some, or all, of the one or more attributes of the inventory organization, where the validations are associated with inventory module 420. In an embodiment, the validations include at least one of: verifying that required inventory organization fields are complete; verifying that the inventory organization does not already exist; verifying that the location does not already exist; or verifying that the account information is complete and/or active. Inventory module 420 subsequently sends a notification in an event that any validation fails, and further sends a notification in an event that any data is incomplete.

Inventory module 420 subsequently generates inventory organization data associated with inventory module 420, where the inventory organization data includes one, some, or all, of the one or more attributes of the inventory organization. Further, the inventory organization data associated with inventory module 420 includes additional attributes of the inventory organization that are generated based on one, some, or all, of the one or more attributes of the inventory organization, and based on one or more rules. In an embodiment, the inventory organization data includes at least one of: location information; organization headers; organization parameters; organization spare parts planning ("SPP"); receiving; sub-inventories; planner codes; account aliases; hierarchies; item class compilation information; item class information; planning parameters; item propagation information; shipping networks; shipping methods; or item class assignment. Inventory module 420 further stores the generated inventory organization data within a database. In one embodiment, the database is an APEX database.

Inventory module 420 further retrieves the inventory organization data from the database and automatically generates an XML file that includes the inventory organization data. Subsequently, inventory module 420 sends the XML file to a data migration application. In one embodiment, the data migration application is an iSetup interface. Inventory module 420 subsequently loads the inventory organization data contained within the XML file into one or more database fields of one or more database tables of a database of an electronic business system using the data migration application. In one embodiment, the one or more database tables are GSI tables. Inventory module 420 subsequently sends a notification that the inventory organization data has been loaded into the database of the electronic business system.

With respect to item propagation information, in one embodiment, inventory module 420 can trigger a concurrent item propagation process that requires a MTL_SYSTEM_ITEMS_INTERFACE table to be populated with one or more items that will be propagated into the new inventory organization. The table population can be performed by inventory module 420, and then the current item propagation process can be triggered. The flow then concurrently proceeds to TCA/CDI module 430 and fulfillment module 440.

TCA/CDI module 430 performs validations on one, some, or all, of the one or more attributes of the inventory organization, where the validations are associated with TCA/CDI module 430. In an embodiment, the validations include at least one of: verifying that an inventory organization setup is complete; verifying that a location setup is complete; verifying that "bill-to" functionality is needed; or verifying that "ship-to" functionality is needed. TCA/CDI module 430 sends a notification in an event that any validation fails, and further sends a notification in an event that any data is incomplete.

TCA/CDI module 430 subsequently generates inventory organization data associated with TCA/CDI module 430, where the inventory organization data includes one, some, or all, of the one or more attributes of the inventory organization. Further, the inventory organization data associated with TCA/CDI module 430 includes additional attributes of the inventory organization that are generated based on one, some, or all, of the one or more attributes of the inventory organization, and based on one or more rules. TCA/CDI module 430 further sends the inventory organization data to an external TCA/CDI module (not shown in FIG. 4A). The external TCA/CDI module directly loads the inventory organization data into one or more database fields of one or more database tables of a database of the electronic business system. In one embodiment, the one or more database tables are GSI tables. TCA/CDI module 430 subsequently sends a notification that the inventory organization data has been loaded into the database of the electronic business system.

Fulfillment module 440 performs validations on one, some, or all, of the one or more attributes of the inventory organization, where the validations are associated with fulfillment module 440. In an embodiment, the validations include at least one of: verifying one or more shipping methods; verifying one or more shipping parameters; verifying one or more shipping pick rules; verifying one or more region-based TLTs; or verifying a reference organization. Fulfillment module 440 subsequently sends a notification in an event that any data is incomplete.

Fulfillment module 440 subsequently generates inventory organization data associated with fulfillment module 440, where the inventory organization data includes one, some, or all, of the one or more attributes of the inventory organization. Further, the inventory organization data associated with fulfillment module 440 includes additional attributes of the inventory organization that are generated based on one, some, or all, of the one or more attributes of the inventory organization, and based on one or more rules. In an embodiment, the inventory organization data includes at least one of: shipping methods; shipping parameters; shipping pick rules; or region-based TLTs. Fulfillment module 440 further stores the generated inventory organization data within a database. In one embodiment, the database is an APEX database.

Fulfillment module 440 further retrieves the inventory organization data from the database and automatically generates an XML file that includes the inventory organization data. Subsequently, fulfillment module 440 sends the XML file to a data migration application. In one embodiment, the data migration application is an iSetup interface. Fulfillment module 440 subsequently loads the inventory organization data contained within the XML file into one or more database fields of one or more database tables of a database of the electronic business system using the data migration application. In one embodiment, the one or more database tables are GSI tables. Fulfillment module 440 subsequently sends a notification that the inventory organization data has been loaded into the database of the electronic business system. The flow then proceeds to planner desktop module 450.

Planner desktop module 450 performs validations on one, some, or all, of the one or more attributes of the inventory organization, where the validations are associated with planner desktop module 450. In an embodiment, the validations include at least one of: verifying one or more HZ locations; verifying one or more contacts; verifying whether the inventory organization is a direct organization or an indirect organization; verifying spares management; verifying one or more cutoff times; verifying a service company (e.g., DHL) warehouse code; verifying a node type; verifying a node name; verifying a stocking site type; verifying a calendar; verifying a time zone; verifying a managing entity; verifying stocking part exclusion; verifying a geographical code address; or verifying one or more delivery times. Planner desktop module 450 subsequently sends a notification in an event that any validation fails, and further sends a notification in an event that any data is incomplete.

Planner desktop module 450 subsequently generates inventory organization data associated with planner desktop module, where the inventory organization data includes one, some, or all, of the one or more attributes of the inventory organization. Further, the inventory organization data associated with planner desktop module 450 includes additional attributes of the inventory organization that are generated based on one, some, or all, of the one or more attributes of the inventory organization, and based on one or more rules.

In an embodiment, the inventory organization data includes at least one of: geo-coding (concurrent); sub-inventories; human zone ("HZ") locations; contacts; direct/indirect organization; spares management (min/max); cutoff times; service company (e.g., DHL) warehouse code; node type; node name; stocking site type; calendar; time zone; managing entity; stocking part exclusion; and delivery times. Planner desktop module 450 further stores the generated inventory organization data within a database. In one embodiment, the database is an APEX database.

Planner desktop module 450 further retrieves the inventory organization data from the database and automatically generates an XML file that includes the inventory organization data. Subsequently, planner desktop module 450 sends the XML file to a data migration application. In one embodiment, the data migration application is an iSetup interface. Planner desktop module subsequently loads the inventory organization data contained within the XML file into one or more database fields of one or more database tables of a database of the electronic business system using the data migration application. In one embodiment, the one or more database tables are GSI tables. Planner desktop module 450 subsequently sends a notification that the inventory organization data has been loaded into the database of the electronic business system. The flow then proceeds to HR module 460.

HR module 460 updates security profile data associated with the new inventory organization that is stored within one or more database fields of one or more database tables of a database of the electronic business system. In one embodiment, the one or more database tables are GSI tables. Further, in an embodiment of the invention, the one or more database tables include the following database tables: MISINV_SPARES_ALL; MISINV_SPARES_(APAC, AMER, EMEA, LAD); or a field service security profile (such as DBI) database table. The flow then proceeds to GPO module 470.

GPO module 470 generates a request for approval of the new inventory organization sends the request for approval to an external GPO module. In one embodiment, the request for approval is a report that includes inventory organization data, such as shipping networks, accounting information (e.g., organization parameters), and sub-inventory parameters. When GPO module 470 receives an approval from the external GPO module, GPO module 470 sends a notification that confirms completion of the inventory organization completion process. The flow then proceeds to inventory closing module 480.

Inventory closing module 480 generates a request for approval of the new inventory organization sends the request for approval to an external inventory closing module. In one embodiment, the request for approval is a report that includes inventory organization data, such as hierarchies, and organization unit general ledger ("GL") information. When inventory closing module 480 receives an approval from the external inventory closing module, inventory closing module 480 sends a notification that confirms completion of the inventory organization completion process. The flow then ends.

Figure 5A:
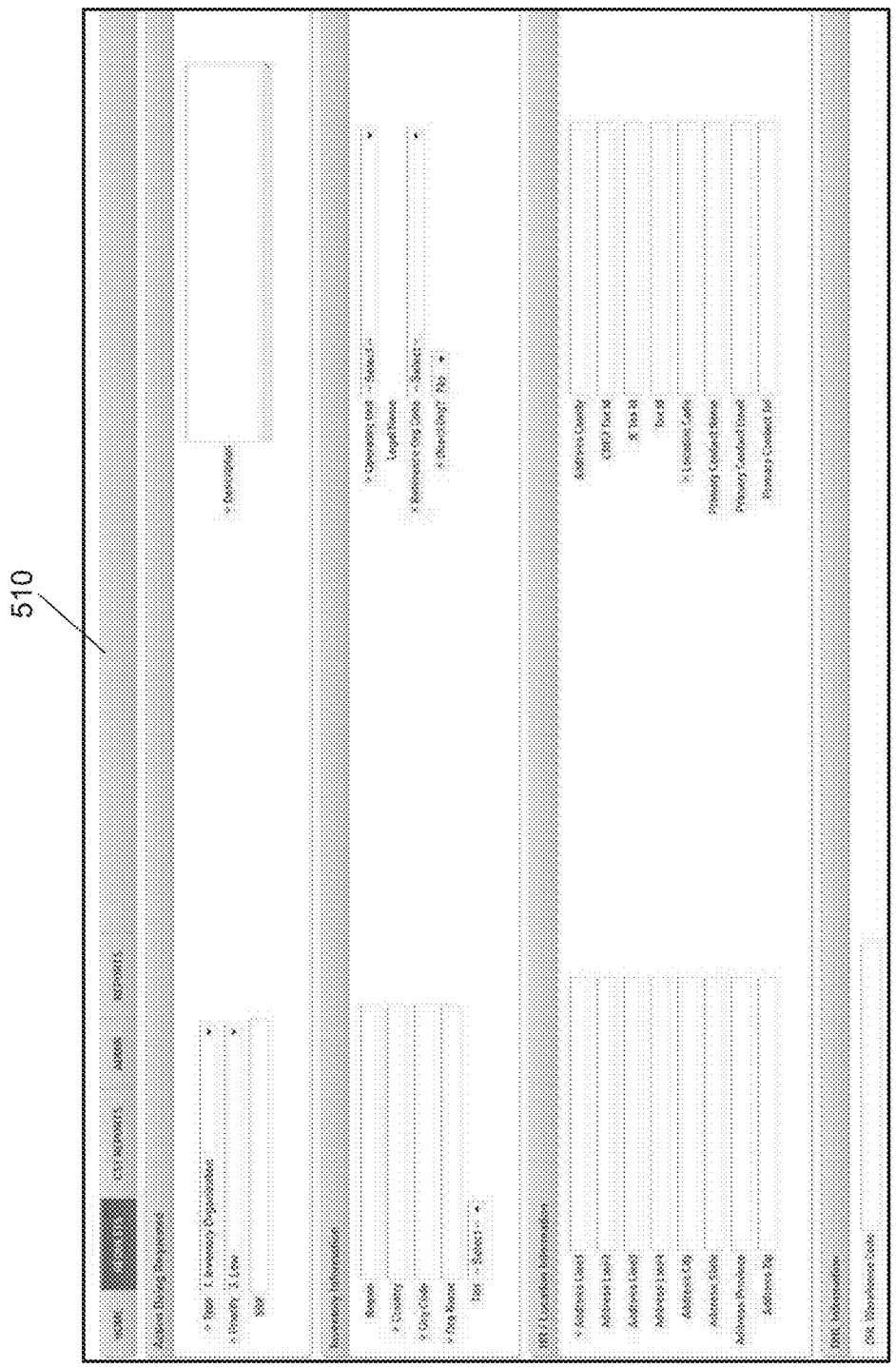
FIGS. 5A and 5B illustrate example user interfaces for submitting a request to create an inventory organization to an inventory management system, according to an embodiment of the invention.
Figure 5B:
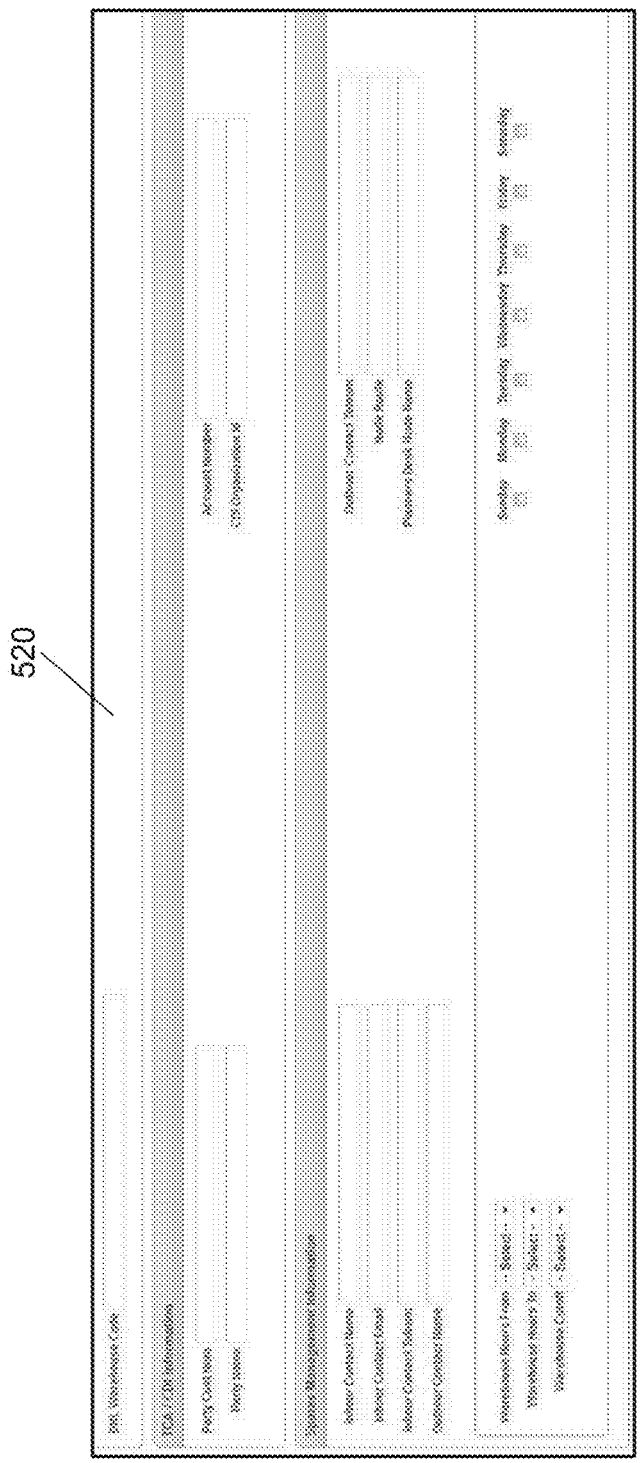

FIGS. 5A and 5B illustrate example user interfaces 510 and 520 for submitting a request to create an inventory organization to an inventory management system, according to an embodiment of the invention. User interfaces 510 and 520 display an electronic template that includes one or more inventory organization fields. A user can input one or more attributes of the inventory organization that the user wishes to create within the one or more inventory organization fields of the electronic template. According to the embodiment, user interface 510 includes the following inventory organization fields: action type; action priority; SR number; description; region; country; organization code; organization name; tier; operating unit; legal name; reference organization code; direct organization indication; location address (lines 1-4); location address city; location address state; location address province; location address zip code; location address country; CNPJ tax identifier; IE tax identifier; tax identifier; location code; primary contact email address; primary contact telephone number; and service company (e.g., DHL) warehouse code. In accordance with the embodiment, the user can input an attribute of the inventory organization within one or more the aforementioned inventory organization fields within user interface 510.

Also according to the embodiment, user interface 520 includes the following inventory organization fields: party customer number; party name; account number; CU organization identifier; in-hour contact name; in-hour contact email address; in-hour contact telephone number; out-hour contact name; out-hour contact telephone number; node route; planner desktop node name; warehouse hours, warehouse cutoff; and warehouse days. In accordance with the embodiment, the user can input an attribute of the inventory organization within one or more the aforementioned inventory organization fields within user interface 520.

FIG. 6 illustrates a flow diagram of the functionality of an inventory organization setup module (such as inventory organization setup module 16 of FIG. 1), according to an embodiment of the invention. The flow begins and proceeds to 605. At 605, a request is received to create an inventory organization. The flow proceeds to 610. At 610, an electronic template is displayed within a graphical user interface, where the electronic template includes one or more inventory organization fields. The flow then proceeds to 615. At 615, one or more attributes of the inventory organization that are input within the one or more inventory organization fields of the electronic template are received. The flow then proceeds to 620.

At 620, the one or more attributes of the inventory organization are validated. In certain embodiments, it can be determined whether all required attributes of the inventory organization have been input within the one or more inventory organization fields of the electronic template. In some of these embodiments, it can also be determined whether the inventory organization already exists within an electronic business system. In certain embodiments, the one or more attributes of the inventory organization can be automatically validated by a computer system. The flow then proceeds to 625.

At 625, inventory organization data is generated based on the one or more attributes of the inventory organization and one or more rules, where the inventory organization data includes the one or more attributes of the inventory organization. In certain embodiments, one or more additional attributes of the inventory organization can be generated based on the one or more attributes that are input within the electronic template, and based on the one or more rules. In certain embodiments, the inventory organization data can include inventory data. In some of these embodiments, wherein the inventory data can include: location information; organization headers; organization parameters; sub-inventories; account aliases; hierarchies; classes; planning parameters; item propagation; shipping networks; shipping methods; or class assignments. Further, in certain embodiments, the organization data can include fulfillment data. In some of these embodiments, the fulfillment data can include: shipping methods; shipping parameters; shipping pick rules; or region-based transit lead times. In certain embodiments, the inventory organization data can be automatically generated using a computer system. The flow then proceeds to 630.

At 630, the inventory organization data is populated into one or more fields of one or more tables of a database. In certain embodiments, the inventory organization data can be automatically populated into the one or more fields of the one or more tables of the database using a computer system. Further, in certain embodiments, the database is a custom database schema hosted alongside a database of the electronic business system. The flow then proceeds to 635.

At 635, one or more XML files are generated that include the inventory organization data. In certain embodiments, the XML files can be automatically generated using a computer system. The flow then proceeds to 640.

At 640, the one or more XML files are loaded into the electronic business system. In certain embodiments, the one or more XML files can be automatically loaded into the electronic business system using a computer system. The flow then proceeds to 645.

At 645, the inventory organization data is populated from the one or more XML files into the database of the electronic business system. In certain embodiments, the inventory organization data is automatically populated from the one or more XML files into the database of the electronic business system using a computer system. The flow then proceeds to 650.

At 650, a notification is sent to a user of the electronic business system that notifies the user that the inventory organization has been created. The flow then proceeds to 655.

At 655, a request is sent to approve a creation of the inventory organization to a user of the electronic business system. The flow then ends.

Thus, an inventory management system is provided that can automatically create a new inventory organization within an electronic business system. The inventory management system can automatically generate inventory organization data based on validated input inventory organization data (e.g., attributes of an inventory organization), and can store the inventory organization data within a database of the inventory management system. The inventory management system can further push the inventory organization data from the database of the inventory management system to a database of the electronic business system.

The automated end-to-end inventory organization setup process of the inventory management system can improve and/or enhance a setup process for setting up a new inventory organization in many different ways. First, the inventory management system can reduce a response time associated with a creation of each inventory organization (e.g., from 24 business days to 7 business days). Further, the inventory management system can provide automatic system and data validations that can prevent human error while uploading the generated inventory organization data to the electronic business system. Such validations can prevent duplicate data being created within the electronic business system, and can also prevent necessary data from being missing. The inventory management system can further avoid the handling (e.g., copying and pasting) of data by several modules. The sending of reports to validation modules can further be automated by the inventory management system. The inventory management system can further automatically prepopulate inventory organization data based on one or more rules associated with a region, country, or organization type, and further based on initial inventory organization data, such as attributes of an inventory organization, that is input by a user. Finally, the inventory management system can further avoid the creation of inventory organization data within multiple environments, as the inventory organization data can be directly loaded into a production environment. This can further reduce the response time (e.g., from 24 business days to 3 business days).

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to set up an inventory organization within an electronic business system, the setting up comprising:

displaying a graphical user interface, including an electronic template for a custom database, to a user, the electronic template including inventory organization fields, wherein the custom database is configured to be hosted alongside the electronic business system and to provision resources associated with the electronic business system;

receiving attributes of the inventory organization that are input by the user using the inventory organization fields of the electronic template for the custom database, the attributes including one or more of inventory information, fulfillment information, location information, and contact information;

in response to receiving a selection of a first graphical user interface element by the user, validating the attributes of the inventory organization;

automatically creating the inventory organization of the custom database using an automated end-to-end process without further interaction with the user, including:

generating, by an application development framework, additional attributes for the custom database not included in the electronic template using a plurality of first rules that define a set of additional attributes based on an organization type tier for the inventory organization and the received attributes of the inventory organization, generating, by the application development framework, inventory organization data using a plurality of second rules that define inventory organization data values for at least a portion of the additional attributes generated for the inventory organization, populating, by the application development framework, the inventory organization data generated by the application development framework into the custom database; and generating extensible markup language (XML) files from the custom database of the application development framework, wherein, the XML files include tags that correspond to inventory organization data and an application programming interface (API) portion, each file comprising a different mix of tags and API portion, wherein the API portion identifies the inventory organization data that corresponds to the tags within each XML file, and the XML files configure a data migration application to populate the inventory organization data into a database of an electronic business system, wherein the data migration application is configured to read select API information from the API portions of the XML files, load a specific interface based on the read API information, and match the tags from the XML files to gather the inventory organization data used to populate one or more tables of the database of the electronic business system.

2. The non-transitory computer-readable medium of claim 1, further comprising:

sending a request to approve a creation of the inventory organization to a user of the electronic business system.

3. The non-transitory computer-readable medium of claim 1, wherein the inventory data comprises at least one of:
location information;
organization headers;
organization parameters;
sub-inventories;
account aliases;
hierarchies;
classes;
planning parameters;
item propagation;
shipping networks;
shipping methods; or
class assignments.

4. The non-transitory computer-readable medium of claim 1, wherein the fulfillment data further comprises at least one of:
shipping methods;
shipping parameters;
shipping pick rules; or
region-based transit lead times.

5. The non-transitory computer-readable medium of claim 1, wherein the validating the attributes of the inventory organization further comprises at least one of:
determining whether all required attributes of the inventory organization have been input within the inventory organization fields of the electronic template; or
determining whether the inventory organization already exists within the electronic business system.

6. The non-transitory computer-readable medium of claim 1, wherein,
the database of the electronic business system is part of a global single instance (GSI) model of the electronic business system,
the data migration application is configured to sequentially load portions of the inventory organization data contained within each XML file into one or more database fields of one or more database tables of the database of the electronic business system, and the one or more database fields are associated with a specific module of the electronic business system, the electronic business system comprising a plurality of modules,
validations for the attributes of the inventory organization are performed for the specific module, the inventory organization data is generated using a plurality of the second rules for the specific module, and the XML files are generated for the specific module, and
the validating the attributes of the inventory organization, generating the inventory organization data, populating the inventory organization data into the custom database, and generating the XML files from the custom database is repeated for multiple of the plurality of modules of the electronic business system.

7. The non-transitory computer-readable medium of claim 1, wherein at least one of the received attributes of the inventory organization indicates a status for the inventory organization, and at least one of the plurality second rules defines an inventory organization data value based on the indicated status.

8. The non-transitory computer-readable medium of claim 1, wherein at least of portion of the plurality of first rules define a first set of additional attributes based on an organization type of a first tier and a second set of additional attributes based on an organization type of a second tier, the first set of additional attributes being different from the second set of additional attributes.

9. The non-transitory computer-readable medium of claim 1, wherein the custom database comprises a custom database schema hosted alongside one or more databases for the electronic business system that is used to provision one or more custom applications associated with the electronic business system.

10. A computer-implemented method for setting up an inventory organization within an inventory management system, the computer-implemented method comprising:

displaying a graphical user interface, including an electronic template for a custom database, to a user, the electronic template including inventory organization fields, wherein the custom database is configured to be hosted alongside the electronic business system and to provision resources associated with the electronic business system;

receiving attributes of the inventory organization that are input by the user using the inventory organization fields of the electronic template for the custom database, the attributes including one or more of inventory information, fulfillment information, location information, and contact information;

in response to receiving a selection of a first graphical user interface element by the user, validating the attributes of the inventory organization;

automatically creating, by a processor, the inventory organization of the custom database using an automated end-to-end process without further interaction with the user, including:

generating, by an application development framework, additional attributes for the custom database not included in the electronic template using a plurality of first rules that define a set of additional attributes based on an organization type tier for the inventory organization and the received attributes of the inventory organization, generating, by the application development framework, inventory organization data using a plurality of second rules that define inventory organization data values for at least a portion of the additional attributes generated for the inventory organization, populating, by the application development framework, the inventory organization data generated by the application development framework into the custom database; and generating extensible markup language (XML) files from the custom database of the application development framework, wherein, the XML files include tags that correspond to inventory organization data and an application programming interface (API) portion, each file comprising a different mix of tags and API portion, wherein the API portion identifies the inventory organization data that corresponds to the tags within each XML file, and the XML files configure a data migration application to populate the inventory organization data into a database of an electronic business system, wherein the data migration application is configured to read select API information from the API portions of the XML files, load a specific interface based on the read API information, and match the tags from the XML files to gather the inventory organization data used to populate one or more tables of the database of the electronic business system.

11. The computer-implemented method of claim 10, further comprising:

sending a request to approve a creation of the inventory organization to a user of the electronic business system.

12. The computer-implemented method of claim 10, wherein the validating the attributes of the inventory organization further comprises at least one of:

determining whether all required attributes of the inventory organization have been input within the inventory organization fields of the electronic template; or determining whether the inventory organization already exists within the electronic business system.

13. The method of claim 10, wherein, the database of the electronic business system is part of a global single instance (GSI) model of the electronic business system, the data migration application is configured to sequentially load portions of the inventory organization data contained within each XML file into one or more database fields of one or more database tables of the database of the electronic business system, and the one or more database fields are associated with a specific module of the electronic business system, the electronic business system comprising a plurality of modules, validations for the attributes of the inventory organization are performed for the specific module, the inventory organization data is generated using a plurality of the second rules for the specific module, and the XML files are generated for the specific module, and the validating the attributes of the inventory organization, generating the inventory organization data, populating the inventory organization data into the custom database, and generating the XML files from the custom database is repeated for multiple of the plurality of modules of the electronic business system.

14. A system for setting up an inventory organization within an inventory management system, the system comprising a memory coupled to a processor that is configured to:

display a graphical user interface, including an electronic template for a custom database, to a user, the electronic template including inventory organization fields, wherein the custom database is configured to be hosted alongside the electronic business system and to provision resources associated with the electronic business system;

receive attributes of the inventory organization that are input by the user using the inventory organization fields of the electronic template for the custom database, the attributes including one or more inventory information, fulfillment information, location information, and contact information;

in response to receiving a selection of a first graphical user interface element by the user, validate the attributes of the inventory organization;

automatically create the inventory organization of the custom database using an automated end-to-end process without further interaction with the user, including:

generate, by an application development framework, additional attributes for the custom database not included in the electronic template using a plurality of first rules that define a set of additional attributes based on an organization type tier for the inventory organization and the received attributes of the inventory organization, generate, by the application development framework, inventory organization data using a plurality of second rules that define inventory organization data values for at least a portion of the additional attributes generated for the inventory organization, populate, by the application development framework, the inventory organization data generated by the application development framework into the custom database; and generate extensible markup language (XML) files from the custom database of the application development framework, wherein, the XML files include tags that correspond to inventory organization data and an application programming interface (API) portion, each file comprising a different mix of tags and API portion, wherein the API portion identifies the inventory organization data that corresponds to the tags within each XML file, and the XML files configure a data migration application to populate the inventory organization data into a database of an electronic business system, wherein the data migration application is configured to read select API information from the API portions of the XML files, load a specific interface based on the read API information, and match the tags from the XML files to gather the inventory organization data used to populate one or more tables of the database of the electronic business system.

15. The system of claim 14, wherein the processor is further configure to:

send a request to approve a creation of the inventory organization to a user of the electronic business system.

16. The system of claim 14, wherein the processor is further configured to:
- determine whether all required attributes of the inventory organization have been input within the inventory organization fields of the electronic template; and
- determine whether the inventory organization already exists within the electronic business system.

17. The system of claim 14, wherein,
- the database of the electronic business system is part of a global single instance (GSI) model of the electronic business system,
- the data migration application is configured to sequentially load portions of the inventory organization data contained within each XML file into one or more database fields of one or more database tables of the database of the electronic business system, and the one or more database fields are associated with a specific module of the electronic business system, the electronic business system comprising a plurality of modules,
- validations for the attributes of the inventory organization are performed for the specific module, the inventory organization data is generated using a plurality of the second rules for the specific module, and the XML files are generated for the specific module, and
- the validating the attributes of the inventory organization, generating the inventory organization data, populating the inventory organization data into the custom database, and generating the XML files from the custom database is repeated for multiple of the plurality of modules of the electronic business system.

* * * * *

UNITED STATES PATENT AND TRADEMARK OFFICE
CERTIFICATE OF CORRECTION

PATENT NO. : 10,445,688 B2
APPLICATION NO. : 14/507888
DATED : October 15, 2019
INVENTOR(S) : Kondragunta et al.

Page 1 of 1

It is certified that error appears in the above-identified patent and that said Letters Patent is hereby corrected as shown below:

In the Claims

In Column 20, Line 30, in Claim 8, delete "at least of portion of" and insert -- at least a portion of --, therefor.

Signed and Sealed this
Thirteenth Day of October, 2020

Andrei Iancu
*Director of the United States Patent and Trademark Office*